United States Patent Office 3,325,520
Patented June 13, 1967

3,325,520
(OPTIONALLY 17-HYDROCARBON-SUBSTITUTED) 11,13β-DIALKYLGON-4-EN-3-ONES AND ESTERS CORRESPONDING
John S. Baran, Morton Grove, Ill., assignor to G. D. Searle & Co., Chicago, Ill., a corporation of Delaware
No Drawing. Filed Dec. 8, 1965, Ser. No. 512,539
8 Claims. (Cl. 260—397.45)

The present invention is concerned with novel steroidal derivatives characterized by an 11-alkyl substituent and, in particular, with (optionally 17-hydrocarbon-substituted) 11,13β-dialkylgon-4-en-3-ones and esters corresponding which are represented by the following structural formula

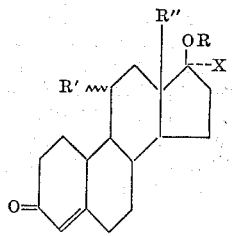

wherein R' and R" are lower alkyl radicals, X is hydrogen or a lower aliphatic hydrocarbon radical. R can be hydrogen or a lower alkanoyl radical and the wavy line indicates that the alkyl substituent at the 11-position can possess either the α or β stereochemical configuration.

The lower aliphatic hydrocarbon radicals encompassed by the X term are exemplified by lower alkyl radicals such as methyl, ethyl, propyl, butyl, pentyl, hexyl, heptyl and the branched-chain groups isomeric therewith, lower alkenyl radicals such as vinyl, propenyl, butenyl, pentenyl, hexenyl, heptenyl and the corresponding branched-chain isomers and lower alkynyl radicals such as ethynyl, propynyl, butynyl, pentynyl, hexynyl, heptynyl and the corresponding branched-chain isomeric groups.

Starting materials suitable for utilization in the manufacture of compounds of the present invention are those represented by the following structural formula

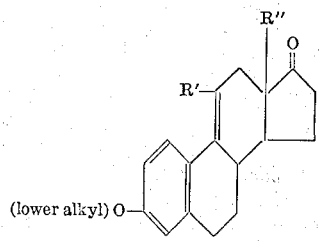

wherein R' and R" are as hereinbefore defined. Their manufacture is described in my co-pending application Ser. No. 497,462, filed Oct. 18, 1965. Reaction of those starting materials with a metallic reducing agent results in selective reduction of the 17-keto function to produce the corresponding 17-hydroxy compounds. As a specific example, 3-methoxy-11-methylestra-1,3,5(10),9(11)-tetraen-17-one in tetrahydrofuran is contacted with lithium tri-(tertiary-butoxy) aluminum hydride, thus affording 3-methoxy - 11-methylestra-1,3,5(10),9(11)-tetraen-17β-ol. Reduction of the 9(11) double bond is conveniently effected by reaction of the latter substances with hydrogen in the presence of a suitable hydrogenation catalyst. The aforementioned 3 - methoxy-11-methylestra-1,3,5(10), 9(11)-tetraen-17β-ol is thus shaken with hydrogen in the presence of 10% palladium-on-carbon catalyst to yield 3-methoxy-11β-methylestra-1,3,5(10)-trien-17β-ol. An alternate route to the latter substances involves initial hydrogenation of the 9(11) double bond and subsequent reduction of the 17-keto group. The aforementioned 3-methoxy-11-methylestra-1,3,5(10),9(11)-tetraen-17-one is thus hydrogenated to afford 3-methoxy-11β-methylestra-1,3,5 (10)-trien-17-one, which is reduced to yield 3-methoxy-11β - methylestra-1,3,5(10)-trien-17β-ol. Reduction of those estratrienes with an alkali metal-liquid ammonia combination results in the corresponding estra-2,5(10)-dienes. Typically, 3-methoxy-11β-methylestra-1,3,5(10)-trien-17β-ol in tetrahydrofuran is contacted with sodium and liquid ammonia to afford 3-methoxy-11β-methylestra-2,5(10)-dien-17β-ol. Cleavage of those enol ethers by heating in dilute acid solution affords the desired 3-keto-Δ⁴ substances of the present invention. 3-methoxy-11β-methylestra-2,5(10)-dien-17β-ol, for example, is heated with dilute hydrochloric acid in methanol to produce 17β-hydroxy - 11β-methylestra-4-en-3-one. Hydrolysis under milder conditions results in the corresponding Δ⁵⁽¹⁰⁾ isomers. 3-methoxy-11β,17α-dimethylestra-2,5(10)-dien-17β-ol is thus contacted at room temperature with acetic acid in acetone to afford 17β-hydroxy-11β,17α-dimethylestr-5 (10)-en-3-one.

The 17α-alkynyl compounds of the present invention are conveniently obtained by reaction of a 3-alkoxy-11, 13β-dialkylgona-2,5(10-dien-17-one with the appropriate lower alkyne followed by cleavage of the enol ether function according to processes described hereinbefore. The required 17-keto compounds are obtained by oxidation of the corresponding 17-hydroxy substances. Typically, the aforementioned 3-methoxy-11β-methylestra-2,5 (10)-dien-17β-ol is heated with aluminum isopropoxide and cycolhexanone in toluene to afford 3-methoxy-11β-methylestra-2,5(10)-dien-17-one. The reaction of that substance with lithium acetylide, suitably in the form of its ethylene diamine complex, results in 17α-ethynyl-3-methoxy-11β-methylestra-2,5(10)-dien-17β-ol, which is contacted with dilute hydrochloric acid in methanol to yield 17α-ethynyl-17β-hydroxy-11β-methylestr-4-en-3-one.

The 17-alkyl derivatives of this invention can be produced by allowing the aforementioned 3-alkoxy-11β,13β-dialkylgona-2,5(10)-dien-17-ones to react with an alkyl organometallic reagent, then cleaving the resulting 17-alkyl-17-hydroxy-3-alkyl enol ethers, as described hereinbefore or, alternatively, but utilizing the corresponding gona-1,3,5(10)-trienes as starting materials. As a specific example, 3-methoxy-11β-methylestra-1,3,5(10)-trien-17-one is heated at the reflux temperature with ethereal methyl magnesium bromide in tetrahydrofuran to yield 3-methoxy - 11β,17α-dimethylestra-1,3,5(10)-trien-17β-ol. That substance in tetrahydrofuran is stirred with sodium and liquid ammonia containing tertiary-butyl alcohol, thus producing 3-methoxy-11β,17α-dimethylestra-2,5(10)-dien-17β-ol. Heating of that enol ether in methanol with dilute hydrochloric acid results in the instant 17β-hydroxy-11β, 17α-dimethylestr-4-en-3-one.

When the aforementioned 3-methoxy-11,13β-dialkylgona-1,3,5(10),9(11)-tetraen-17-ones are reduced with an alkali metal-liquid ammonia combination, there are produced the corresponding 3-methoxy-11α,13β-dialkylgona-1,3,5(10)-trien-17β-ols. Oxidation, typically with chromic acid, affords the corresponding 17-keto compounds. The latter intermediates are subjected to the processes described hereinbefore to produce the 11α-alkyl compounds of the present invention. As a specific example, 3-methoxy-11-methylestra-1,3,5(10),9(11)-tetraen-17-one in tetrahydrofuran is contacted with lithium metal in liquid ammonia containing aniline. The resulting 3-methoxy-11α-methylestra-1,3,5(10)-trien-17β-ol is oxidized with aqueous chromic acid in acetone to afford the corresponding 17-keto substance, which is heated with ethereal methyl magnesium bromide in benzene to afford 3-methoxy-11α,17α-dimethylestra-1,3,5(10)-trien-17β - ol, The latter substance is reduced with lithium and liquid ammonia in tetrahydrofuran containing tertiary-butyl alcohol to afford 3-methoxy-11α,17α-dimethylestra-2,5(10)-dien-17β-ol, which is hydrolyzed with dilute hydrochloric acid in methanol to afford the instant 17β-hydroxy-11α,17α-dimethylestr-4-en-3-one.

Acylation of the 17-hydroxy compounds of the present invention with a lower alkanoic acid anhydride or halide, preferably in the presence of a suitable acid acceptor, results in the corresponding 17-(lower alkanoates). 17α-ethynyl - 17β - hydroxyl-11β-methylestr-4-en-3-one is thus heated with acetic anhydride and pyridine to afford 17β-acetoxy-17α-ethynyl-11β-methylestr-4-en-3-one.

The instant compounds wherein the 13β-alkyl group contains more than one carbon atom are obtained as dl mixtures. Resolution of these dl compounds to afford the individual d and l enantiomorphs is conveniently effected by esterification of the hydroxy group with a dibasic acid anhydride such as succinic or phthalic anhydride to afford the corresponding acid ester which is resolved by means of an optically active amine such as brucine, morphine, quinine, quinidine, strychnine, etc.

The compounds of this invention display valuable pharmacological properties. They are hormonal agents, for example, as is evidenced by their anabolic, androgenic and progestational properties. In addition, they lack the desoxycorticosterone acetate inhibitory activity characteristic of related substances.

The invention will appear more fully from the examples which follow. These examples are given by way of illustration only and are not to be construed as limiting the invention either in spirit or in scope as many modifications both in materials and methods will be apparent from this disclosure to those skilled in the art. In these examples, temperatures are given in degrees centigrade (° C.) and quantities of materials in parts by weight unless otherwise noted.

EXAMPLE 1

A solution of 3 parts of 3-methoxy-11-methylestra-1,3,5(10),9(11)-tetraen-17-one and 9 parts of lithium tri-(tertiary-butoxy) aluminum hydride in 113 parts of tetrahydrofuran is stirred at room temperature for about 2 hours, then is poured into a mixture consisting of 70 parts by volume of 50% aqueous acetic acid and 30 parts of ice. Extraction of that aqueous mixture with chloroform affords an organic solution, which is washed successively with aqueous sodium sulfate and aqueous sodium bicarbonate, then is dried over anhydrous magnesium sulfate and distilled to dryness under reduced pressure to afford, as a viscous oil, 3-methoxy-11-methylestra-1,3,5(10),9(11)-tetraen-17β-ol, characterized by infrared absorption maxima, in chloroform, at about 2.78, 2.90, 6.22 and 6.38 microns.

To a solution of 2.5 parts of 3-methoxy-11-methylestra-1,3,5(10),9(11)-tetraen-17β-ol in 240 parts of methanol is added 0.3 part of 10% palladium-on-carbon catalyst, and the resulting reaction mixture is shaken with hydrogen at atmospheric pressure and room temperature until one molecular equivalent of hydrogen has been absorbed. The catalyst is removed by filtration, and the filtrate is concentrated to dryness under reduced pressure. After standing at room temperature for approximately 48 hours, the initial oily residue becomes crystalline. That material is purified by recrystallization from ether-hexane to afford 3 - methoxy-11β-methylestra-1,3,5(10)-trien-17β-ol, melting at about 103–105°. In potassium bromide this compound exhibits infrared absorption maxima at about 3.00, 6.21, 6.35 and 6.65 microns. It displays also ultraviolet absorption peaks at about 278 and 287 millimicrons with molecular extinction coefficients of about 1800 and 1650, respectively.

To a solution containing 70 parts of liquid ammonia, 45 parts of tetrahydrofuran and 5.6 parts of tertiary-butyl alcohol is added a solution of one part of 3-methoxy-11β-methylestra-1,3,5(10)-trien-17β-ol in 18 parts of tetrahydrofuran, and the resulting mixture is stirred while 0.5 part of sodium is added over a period of about 40 minutes. At the end of that time, the blue color is destroyed by the addition of approximately 8 parts of methanol, and the solution is evaporated to dryness under reduced pressure. Trituration of the residual material with ice water affords a crystalline product, which is collected by filtration, washed with water and dried under reduced pressure to yield 3-methoxy-11β-methylestra-2,5(10)-dien-17β-ol, characterized by infrared absorption maxima, in chloroform, at about 2.99, 5.88 and 5.99 microns.

A solution containing 6 parts of 3-methoxy-11β-methylestra-2,5(10)-dien-17β-ol, 800 parts of methanol and 200 parts of 4 M hydrochloric acid is heated just below the reflux temperature for about 40 minutes, then is cooled and neutralized by the addition of aqueous sodium bicarbonate. Extraction of that aqueous mixture with ether affords an organic solution, which is dried over anhydrous magnesium sulfate and concentrated to dryness under reduced pressure. Trituration of the resulting residue with ether-hexane affords crystals of 17β-hydroxy-11β-methylestr-4-en-3-one, melting at about 158–160°. This compound exhibits an ultraviolet absorption maximum at about 241.5 millimicrons with a molecular extinction of about 15,800 and is characterized by the following structural formula

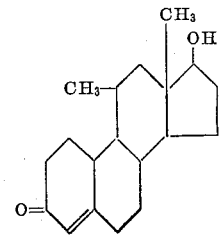

EXAMPLE 2

A solution containing 8 parts of 3-methoxy-11β-methylestra-2,5(10)-dien-17β-ol, 870 parts of toluene, 20 parts of aluminum isopropoxide and 47.5 parts of cyclohexanone is heated at the reflux temperature for about one hour, following which time 500 parts by volume of saturated aqueous sodium potassium tartrate is added. The volatile organic material is removed by steam distillation, and the resulting aqueous residue is cooled and extracted with ether. Drying of the ether extract over anhydrous magnesium sulfate followed by concentration of the solution to dryness affords a residue, which is triturated with hexane to afford crystals of 3-methoxy-11β-methylestra-2,5(10)-dien-17-one, melting at about 137–139°. It displays infrared absorption maxima, in potassium bromide, at about 5.72, 5.90 and 6.00 microns.

A mixture of one part of 3-methoxy-11β-methylestra-2,5(10)-dien-17-one, 25 parts of the 30% lithium acetylide-70% ethylene diamine complex and 450 parts of tetrahydrofuran is stirred in a nitrogen atmosphere at about 0° for approximately 2½ hours, then is diluted with approximately 500 parts of water. The resulting mixture is partially concentrated under reduced pressure, then is extracted with ether. The ether extract is washed with dilute aqueous sodium chloride, then is dried over anhydrous magnesium sulfate and concentrated to dryness under reduced pressure. The crystalline residue containing 17α-ethynyl-3-methoxy-11β-methylestra-2,5(10)-dien-17β-ol is dissolved in 80 parts of methanol, and a solution of 20 parts of 4 N hydrochloric acid in 20 parts of water is added. That solution is heated on the steam bath for about 10 minutes, then is cooled and neutralized by the addition of aqueous sodium bicarbonate. Concentration of that solution to dryness affords the crude product, which is treated with decolorizing carbon, then is recrystallized from ether-hexane to afford 17α-ethynyl-17β-hydroxy-11β-methylestr - 4 - en - 3 - one, melting at about 220°. This compound exhibits infrared absorption maxima, in potassium bromide, at about 2.92, 3.06 and 5.98 microns and is further characterized by the following structural formula

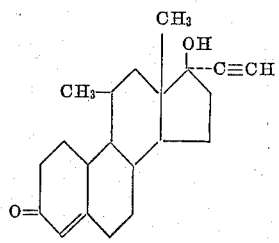

EXAMPLE 3

To a solution of 15 parts by volume of ethereal 3 M methyl magnesium bromide in 63 parts of tetrahydrofuran is added, at the reflux temperature over a period of about 40 minutes, a solution of one part of 3-methoxy-11β-methylestra-1,3,5(10)-trien-17-one in 45 parts of tetrahydrofuran. The resulting reaction mixture is heated at the reflux temperature for about 4 hours, and the excess reagent is then destroyed by the careful addition of methanol to the mixture which has been cooled to 0–5°. That solution is shaken with aqueous sodium potassium tartrate, and the aqueous layer is separated and extracted with methylene chloride. The organic solutions are combined, dried over anhydrous magnesium sulfate and concentrated to dryness under reduced pressure. Purification of the residue by adsorption on a silica gel chromatographic column followed by elution with 5% ethyl acetate in benzene affords 3-methoxy-11β,17α-dimethylestra-1,3,5(10)-trien-17β-ol, melting at about 95–108°.

A solution of 6.4 parts of 3-methoxy-11β,17α-dimethylestra-1,3,5(10)-trien-17β-ol in 225 parts of tetrahydrofuran is added to a mixture containing 700 parts of liquid ammonia, 270 parts of tetrahydrofuran and 80 parts of tertiary-butyl alcohol. To that mixture is added approximately 6 parts of sodium metal over a period of about 55 minutes, after which time the excess reagent is destroyed by the careful addition of methanol. The resulting solution is distilled to dryness under reduced pressure, and the resulting residue containing 3-methoxy-11β,17α-dimethylestra-2,5(10)-dien-17β-ol is dissolved in methanol. To that methanol solution is added 250 parts by volume of 4 M hydrochloric acid, and the resulting mixture is distilled slowly over a period of about 45 minutes, then is neutralized by the addition of aqueous sodium bicarbonate and extracted with chloroform. The chloroform solution is dried over anhydrous magnesium sulfate, then is distilled to dryness under reduced pressure. The resulting residue is purified by adsorption on a silica gel chromatographic column followed by elution with 10–25% ethyl acetate in benzene. Recrystallization from ether-hexane of the eluted fractions affords 17β-hydroxy-11β,17α-dimethyl-estr-4-en-3-one, melting at about 125–126°. This compound exhibits nuclear magnetic resonance peaks at about 61, 69, 73 and 352 cycles per second and is represented by the following structural formula

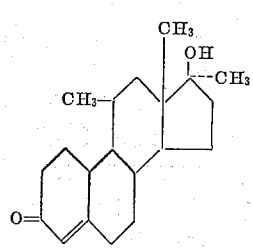

EXAMPLE 4

To a solution of 3.4 parts of 17α-ethynyl-3-methoxy-11β-methylestra-1,3,5(10)-trien-17β-ol in 400 parts of methanol is added 0.5 part of 5% palladium-on-carbon catalyst, and that mixture is shaken with hydrogen at atmospheric pressure and room temperature until 2 molecular equivalents of hydrogen have been absorbed. Removal of the catalyst from the mixture by filtration affords an organic solution, which is concentrated to dryness by distillation under reduced pressure. The resulting residue containing 17α-ethyl-3-methoxy-11β-methylestra-1,3,5(10)-trien-17β-ol is dissolved in 450 parts of tetrahydrofuran, and that solution is added with stirring to a mixture containing 105 parts of liquid ammonia, 45 parts of tetrahydrofuran and 8 parts of tertiary-butyl alcohol. The resulting mixture is stirred while 0.8 part of metallic sodium is added over a period of about 30 minutes. Destruction of the excess reagent by the addition of methanol followed by removal of the solvent by distillation under reduced pressure affords a residue, which is triturated with methanol to afford crystalline 17α-ethyl-3-methoxy-11β-methylestra-2,5(10)-dien-17β-ol. That crystalline material is dissolved in 160 parts of methanol, and 40 parts of 2 M hydrochloric acid is added. That solution is heated at a temperature just below the reflux point in a nitrogen atmosphere for about 10 minutes, then is neutralized by the addition of aqueous sodium bicarbonate and concentrated by distillation under reduced pressure. Extraction of that residual mixture with benzene affords an organic solution, which is dried over anhydrous magnesium sulfate, then distilled to dryness under reduced pressure. The resulting crude product is purified by preparative thin layer chromatography on silica gel. The chromatogram is developed with 15% ethyl acetate in benzene, and the silica gel fraction containing the desired product is stirred with ethyl acetate for about 10 minutes. The ethyl acetate extract is concentrated to dryness to afford 17α-ethyl-17β-hydroxy-11β-methylestr-4-en-3-one, melting at about 58–61° This compound exhibits an ultraviolet absorption maximum at about 241.5 millimicrons with a molecular extinction coefficient of about 16,700. It is represented by the following structural formula

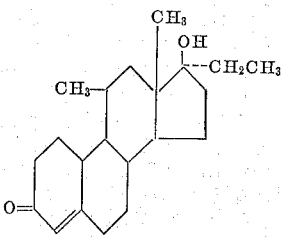

EXAMPLE 5

To a mixture containing 280 parts of liquid ammonia, 25 parts of aniline and 155 parts of tetrahydrofuran is added, with stirring, a solution of 3 parts of 3-methoxy-11-methylestra-1,3,5(10);9(11)-tetraen-17-one in 54 parts of tetrahydrofuran. Approximately 1.5 parts of lithium metal is then added, and the resulting reaction mixture is stirred for about 2 hours, following which time solid ammonium chloride is added in order to destroy the excess reagent. Careful distillation of that mixture to dryness under reduced pressure affords a residue which is extracted into benzene. The benzene layer is separated, washed successively with dilute hydrochloric acid, water and dilute aqueous sodium bicarbonate, then dried over anhydrous magnesium sulfate and stripped of solvent under reduced pressure to afford a residue containing 3-methoxy-11α-methylestra-1,3,5(10)-trien-17β-ol. To a solution of that residue in approximately 80 parts of acetone is added, with stirring over a period of several minutes, 3 parts by volume of an aqueous solution, 8 N in chromium trioxide and 8 N in sulfuric acid. At the end of that time 4 parts of isopropyl alcohol followed by 100 parts of water, 50 parts of saturated aqueous sodium bicarbonate and 300 parts of chloroform are successively added. The resulting mixture is shaken, and the aqueous layer is separated and extracted with chloroform. The chloroform extracts are combined, filtered, dried over anhydrous magnesium sulfate and concentrated to dryness by distillation under reduced pressure. The resulting residue is purified by chromatography on a silica gel chromatographic column followed by elution with one percent ethyl acetate in benzene. The eluted fraction is further purified by recrystallization from methylene chloride-methanol to yield 3 - methoxy-11α - methylestra-1,3,5(10)-trien-17-one, melting at about 128–130°. It exhibits nuclear magnetic resonance maxima at about 51, 69 and 75 cycles per second.

To a refluxing solution of 25 parts by volume of ethereal 3 M methyl magnesium bromide in 308 parts of benzene is added, over a period of about 65 minutes, a solution of one part of 3-methoxy-11α-methylestra-1,3,5(10)-trien-17-one in 132 parts of benzene, and the resulting reaction mixture is heated at the reflux temperature for about 5 hours, then is cooled and diluted carefully with approximately 16 parts of methanol. The diluted mixture is stirred with approximately 300 parts by volume of saturated aqueous sodium potassium tartrate, and the organic layer is separated. The aqueous layer is extracted with benzene, and the combined organic solutions are washed with saturated aqueous sodium potassium tartrate, then dried over anhydrous magnesium sulfate, and concentrated to dryness under reduced pressure to afford 3-methoxy-11α,17α-dimethylestra-1,3,5(10)-trien-17β-ol, which is characterized by infrared absorption maxima at about 2.78, 2.90, 3.42, 6.21 and 6.34 microns.

To a mixture consisting of 70 parts of liquid ammonia, 45 parts of tetrahydrofuran and 8 parts of tertiary-butyl alcohol is added, with stirring, a solution of one part of 3-methoxy-11α,17α-dimethylestra - 1,3,5(10)-trien-17β-ol in 27 parts of tetrahydrofuran. Sufficient lithium wire is added over a period of about one hour to maintain the blue color of the mixture, following which time the excess reagent is destroyed by the addition of methanol. Careful distillation of the reaction mixture to dryness affords a residue, which is partitioned between benzene and water. The organic layer is separated, washed with water, dried over anhydrous magnesium sulfate and concentrated to dryness under reduced pressure to afford a residue containing 3-methoxy-11α,17α-dimethylestra - 2,5(10)-dien-17β-ol. That residue is dissolved in approximately 40 parts of methanol, and 10 parts by volume of 2 M hydrochloric acid is added. The resulting mixture is heated at approximately 70° for about 45 minutes, then is neutralized by the addition of excess aqueous sodium bicarbonate. That aqueous mixture is extracted with chloroform, and the chloroform layer is separated and concentrated to dryness under reduced pressure. The resulting residue is triturated with ether to afford crystalline 17β-hydroxy - 11α,17α-dimethylestr - 4-en-3-one, melting at about 195–197°. It displays an ultraviolet absorption maximum at about 242 millimicrons with a molecular extinction coefficient of about 17,800 and is characterized further by the following structural formula

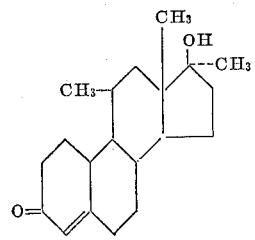

EXAMPLE 6

When an equivalent quantity of dl-13β-ethyl-3-methoxy - 11-methylgona - 1,3,5(10),9(11)-tetraen - 17-one is subjected to the successive processes described in Example 1, there are obtained dl-13β-ethyl - 3-methoxy-11-methylgona - 1,3,5(10),9(11)-tetraen - 17β-ol, dl-13β-ethyl-3-methoxy - 11β-methylgona - 1,3,5(10)-trien-17β-ol, dl-13β-ethyl-3-methoxy - 11β-methylgona - 2,5(10)-dien-17β-ol and dl-13β-ethyl - 17β-hydroxy - 11β-methylgon-4-en-3-one.

EXAMPLE 7

When an equivalent quantity of dl-13β-ethyl - 3-methoxy - 11β-methylgona - 2,5(10)-dien - 17β-ol is substituted as the starting material in the procedure described in Example 2, there are obtained dl-13β-ethyl-3-methoxy - 11β-methylgona - 2,5(10)-dien - 17-one, dl-13β-ethyl - 17α-ethynyl - 3-methoxy - 11β-methylgona-2,5(10)-dien - 17β-ol and dl-13β-ethyl - 17α-ethynyl-17β-hydroxy - 11β-methylgon - 4-en-3-one.

EXAMPLE 8

The substitution of an equivalent quantity of dl-13β-ethyl - 3-methoxy - 11β-methylgona - 1,3,5(10)-trien-17-one as the starting material in the procedure described in Example 3 results in dl-13β-ethyl-3-methoxy - 11β,17α-dimethylgona - 1,3,5(10)-trien - 17β-ol, dl-13β-ethyl-3-methoxy - 11β,17α-dimethylgona - 2,5(10)-dien - 17β-ol and dl-13β-ethyl-17β-hydroxy - 11β,17α-dimethylgon - 4-en-3-one.

EXAMPLE 9

When an equivalent quantity of 11-ethyl-3-methoxyestra-1,3,5(10),9(11)-tetraen-17-one is substituted as the starting material in the process described in Example 1, there are produced 11-ethyl-3-methoxyestra - 1,3,5(10),9(11)-tetraen - 17β-ol, 11β-ethyl - 3-methoxyestra-1,3,5(10)-trien - 17β-ol, 11β-ethyl - 3-methoxyestra-2,5(10)-dien-17β-ol and 11β-ethyl - 17β-hydroxyestr-4-en-3-one.

EXAMPLE 10

When an equivalent quantity of 11β-ethyl - 3-methoxyestra - 2,5(10)-dien-17β-ol is substituted in the processes described in Example 2, there are obtained 11β-ethyl-3-methoxyestra - 2,5(10)-dien-17-one, 11β-ethyl-17α-ethynyl - 3-methoxyestra - 2,5(10)-dien - 17β-ol and 11β-ethyl - 17α-ethynyl - 17β-hydroxyestr-4-en-3-one.

EXAMPLE 11

The substitution of an equivalent quantity of 11β-ethyl-3-methoxyestra - 1,3,5(10)-trien - 17-one as the starting material in the procedure described in Example 3 results in 11β-ethyl - 3-methoxy - 17α-methylestra - 1,3,5(10)-trien - 17β-ol, 11β-ethyl - 3-methoxy - 17α-methyl-estra-2,5(10)-dien - 17β-ol and 11β-ethyl - 17β-hydroxy - 17α-methylestr-4-en-3-one.

EXAMPLE 12

A solution of 4 parts of 17α-ethynyl-3-methoxy-11β-methylestra - 2,5(10)-dien-17β-ol in 200 parts of pyridine is shaken with 0.4 part of 5% palladium-on-carbon catalyst at atmospheric pressure and room temperature until one molecular equivalent of hydrogen is absorbed. The catalyst is removed by filtration, and the filtrate is evaporated to dryness at reduced pressure to afford 3-methoxy-11β-methyl - 17α-vinylestra-2,5(10)-dien-17β-ol.

The acidic hydrolysis of an equivalent quantity of 3-methoxy - 11β-methyl - 17α-vinylestra - 2,5(10)-dien-17β-ol by the procedure described in Example 2 results in 17β-hydroxy - 11β-methyl - 17α-vinylestr-4-en-3-one.

EXAMPLE 13

When an equivalent quantity of propyne is allowed to react with 3-methoxy-11β-methylestra - 2,5(10)-dien-17-one by the procedure described in Example 2, there is produced 3-methoxy - 11β-methyl - 17α-propynylestra-2,5(10)-dien-17β-ol.

The acidic hydrolysis of an equivalent quantity of 3-methoxy-11β-methyl - 17α-propynlestra - 2,5(10)-dien-17β-ol by the procedure described in Example 2, results in 17b-hydroxy - 11β-methyl - 17α-propnylestr-4-en-3-one.

EXAMPLE 14

When an equivalent quantity of 3-methoxy-11β-methyl-17α-propynylestra-2,5(10)-dien-17β-ol is substituted in the procedure of Example 12, there are produced 3-methoxy-11β - methyl - 17α - propenylestra-2,5(10)-dien-17β-ol and 17β-hydroxy-11β-methyl-17α-propenylestr-4-en-3-one.

EXAMPLE 15

A mixture consisting of 6 parts of 3-methoxy-11β,17α-dimethylestra-2,5(10)-dien-17β-ol, 320 parts of acetone, 105 parts of acetic acid and 10 parts of water is stirred in a nitrogen atmosphere for about 30 minutes, then is added dropwise with stirring to a mixture consisting of 75 parts of chloroform and 175 parts by volume of saturated aqueous sodium bicarbonate. The chloroform layer is separated, dried over anhydrous sodium sulfate and concentrated to dryness in a nitrogen atmosphere to afford 17β-hydroxy-11β,17α-dimethylestr-5(10)-en-3-one.

EXAMPLE 16

The reaction of an equivalent quantity of 17β-hydroxy-11β,17α-dimethylestr-5(10)-en-3-one with 4 M hydrochloric acid in methanol according to the procedure described in Example 3 results in 17β-hydroxy-11β,17α-dimethylestr-4-en-3-one, identical with the product of that example.

EXAMPLE 17

A mixture of 2 parts of 17α-ethynyl-17β-hydroxy-11β-methylestr-4-en-3-one, 20 parts of acetic anhydride and 40 parts of pyridine is heated at 90–100° for about 2 hours, then is cooled and poured carefully into water. The resulting aqueous mixture is extracted with benzene, and the organic layer is separated, washed with water, dried over anhydrous sodium sulfate and stripped of solvent under reduced pressure to afford 17β-acetoxy-17α-ethynyl-11β-methylestr-4-en-3-one.

EXAMPLE 18

By substituting an equivalent quantity of propionic anhydride and otherwise proceeding according to the processes described in Example 17, there is produced 17α-ethynyl-11β-methyl-17β-propionoxyestr-4-en-3-one.

What is claimed is:
1. A compound of the formula

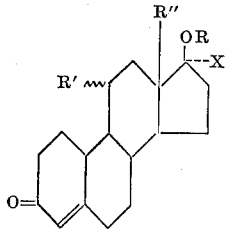

wherein R′ and R″ are lower alkyl radicals, X is selected from the group consisting of hydrogen and a lower aliphatic hydrocarbon radical and R is selected from the group consisting of hydrogen and a lower alkanoyl radical.

2. As in claim 1, a compound of the formula

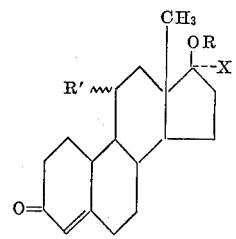

wherein R′ is a lower alkyl radical, X is selected from the group consisting of hydrogen and a lower aliphatic hydrocarbon radical and R is selected from the group consisting of hydrogen and a lower ankanoyl radical.

3. As in claim 1, a compound of the formula

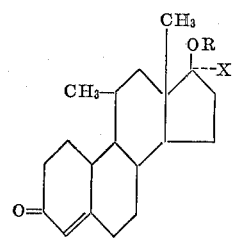

wherein X is selected from the group consisting of hydrogen and a lower aliphatic hydrocarbon radical and R is selected from the group consisting of hydrogen and a lower alkanoyl radical.

4. As in claim 1, the compound which is 17β-hydroxy-11β,17α-dimethylestr-4-en-3-one.

5. As in claim 1, the compound which is 17β-hydroxy-11β-methylestr-4-en-3-one.

6. As in claim 1, the compound which is 17α-ethyl-17β-hydroxy-11β-methylestr-4-en-3-one.

7. As in claim 1, the compound which is 17α-ethynyl-17β-hydroxy-11β-methylestr-4-en-3-one.

8. As in claim 1, the compound which is 17β-hydroxy-11α,17α-dimethylestr-4-en-3-one.

References Cited

UNITED STATES PATENTS 2,891,076   6/1959   Fried _____ 260—397.3
3,048,606   8/1962   Wettstein et al. ____ 260—397.45

LEWIS GOTTS, Primary Examiner.

THOMAS M. MESHBESHER, Assistant Examiner.